(12) United States Patent
Fink

(10) Patent No.: US 9,935,304 B2
(45) Date of Patent: Apr. 3, 2018

(54) LEAD ACID BATTERY HAVING A STRAP MOLDING WELL

(71) Applicant: East Penn Manufacturing Co., Lyon Station, PA (US)

(72) Inventor: Edwin A. Fink, Fleetwood, PA (US)

(73) Assignee: East Penn Manufacturing Co., Lyon Station, PA (US)

( * ) Notice: Subject to any disclaimer, the term of this patent is extended or adjusted under 35 U.S.C. 154(b) by 350 days.

(21) Appl. No.: 14/728,417

(22) Filed: Jun. 2, 2015

(65) Prior Publication Data

US 2015/0349316 A1    Dec. 3, 2015

Related U.S. Application Data

(60) Provisional application No. 62/006,493, filed on Jun. 2, 2014.

(51) Int. Cl.
*H01M 6/42* (2006.01)
*H01M 2/20* (2006.01)
(Continued)

(52) U.S. Cl.
CPC ........... *H01M 2/206* (2013.01); *H01M 2/024* (2013.01); *H01M 2/0242* (2013.01);
(Continued)

(58) Field of Classification Search
CPC ........ H01M 10/12; H01M 10/14; H01M 2/22; H01M 2/043; H01M 2/28; H01M 2/206;
(Continued)

(56) References Cited

U.S. PATENT DOCUMENTS 2,287,802 A    6/1942   Hill
2,480,964 A    9/1949   Randall
(Continued)

FOREIGN PATENT DOCUMENTS

EP    2084764      8/2009
JP    6049557 A    3/1985
(Continued)

OTHER PUBLICATIONS

PCT Notification, International Preliminary Report and Written Opinion of the Searching Authority, dated Dec. 15, 2016, 7 pages.
(Continued)

*Primary Examiner* — Jimmy Vo
(74) *Attorney, Agent, or Firm* — Barley Snyder

(57) ABSTRACT

A lead acid battery has a housing having a plurality of adjacently positioned battery plate receiving compartments. A cell of battery plates is positioned in each battery plate receiving compartment. Each cell has a plurality of positive plates, each having a positive lug, and a plurality of negative plates interleaved with the positive plates, each having a negative lug. A mold positioned on a top edge of each group of battery plates, and has two strap molding wells, each having a lead receiving space, a well base, and a plurality of lug receiving openings positioned in the well base. The positive lugs of the cell extend through the lug receiving openings in one of the strap molding wells, and the negative lugs of the cell extend through the lug receiving openings in the other strap molding well.

17 Claims, 12 Drawing Sheets

(51) Int. Cl.
*H01M 2/02* (2006.01)
*H01M 2/04* (2006.01)
*H01M 2/06* (2006.01)
*H01M 2/10* (2006.01)
*H01M 2/28* (2006.01)
*H01M 10/12* (2006.01)
*H01M 10/14* (2006.01)
*H01M 2/36* (2006.01)

(52) U.S. Cl.
CPC ............. *H01M 2/043* (2013.01); *H01M 2/06* (2013.01); *H01M 2/1077* (2013.01); *H01M 2/28* (2013.01); *H01M 10/12* (2013.01); *H01M 10/14* (2013.01); *H01M 2/362* (2013.01); *H01M 2220/20* (2013.01)

(58) Field of Classification Search
CPC ...... H01M 2/024; H01M 2/0242; H01M 2/06; H01M 2/1077; H01M 2/362
See application file for complete search history.

(56) References Cited

U.S. PATENT DOCUMENTS

| | | |
|---|---|---|
| 2,637,759 A | 5/1953 | Shannon |
| 2,637,758 A | 5/1963 | Shannon |
| 3,194,687 A | 7/1965 | Shannon |
| 3,396,056 A | 8/1968 | Gonnard |
| 3,598,171 A | 8/1971 | Schulz |
| 3,841,915 A | 10/1974 | Eberle |
| 3,915,751 A | 10/1975 | Sanekata et al. |
| 3,988,169 A | 10/1976 | McLean |
| 4,800,142 A | 1/1989 | Bish et al. |
| 5,206,987 A | 5/1993 | Mix |
| 5,227,266 A | 7/1993 | Shaffer et al. |
| 5,318,864 A | 6/1994 | Shannon et al. |
| 5,403,364 A | 4/1995 | Shannon et al. |
| 5,620,809 A | 4/1997 | Shannon et al. |
| 5,885,731 A | 3/1999 | Shannon et al. |
| 6,059,848 A | 5/2000 | Shannon et al. |
| 2010/0143795 A1* | 6/2010 | Partington ............ H01M 2/043 429/178 |
| 2011/0300438 A1 | 12/2011 | Khakhalev |

FOREIGN PATENT DOCUMENTS

| | | |
|---|---|---|
| JP | 6217947 A | 1/1987 |
| WO | 2008040956 A1 | 4/2008 |

OTHER PUBLICATIONS

Abstract of JP 60049557(A), dated Mar. 18, 1985, 1 page.
Abstract of JP 62017947(A), dated Jan. 26, 1987, 1 page.
PCT Notification, International Search Report and Written Opinion, dated Sep. 14, 2015, 10 pages.

* cited by examiner

LEAD ACID BATTERY HAVING A STRAP MOLDING WELL

CROSS-REFERENCE TO RELATED APPLICATION

This application claims priority to U.S. Provisional Application No. 62/006,493, filed Jun. 2, 2014.

FIELD OF THE INVENTION

The invention is generally related to a lead acid battery, and, more specifically, to a lead acid battery having a strap molding well.

BACKGROUND

FIGS. 1 and 2 illustrate a conventional lead acid battery 100. In the conventional battery 100, cells of battery plates 110 are positioned in a battery housing 160. Tabs 111 protrude vertically from a top surface of the battery plates 110, and a lead strap 120 encompasses the tabs 111 of a cell of battery plates 110. A vertical tombstone 130 is positioned at an end of the lead strap 120, and forms a cell-to-cell connection by contacting a lead strap 120 of an adjacent cell of battery plates 110. A round terminal post 140 is positioned at a center of the end lead strap 120 and extends upward through a cover 150, to serve as an external terminal.

The lead straps 120 of a conventional lead acid battery 100 are formed using a steel cast-on mold with the shapes of the lead straps 120, tombstone 130, and terminal post 140 pre-formed therein. The cast-on mold is filled with molten lead, and the cell of battery plates 110 is inverted so that the tabs 111 are immersed in the molten lead. The cast-on mold is cooled, and the lead freezes, encapsulating the tabs 111 of the cell of battery plates 110. The cell of battery plates 110, lead strap 120, tombstone 130, and terminal post 140 are then ejected from the cast-on mold to form a group. Tombstone holes are punched into the battery housing 160 to correspond with the location of the tombstone 130, and the group is re-inverted and placed in the battery housing 160. The tombstone 130 of the group is positioned over the tombstone hole and is welded to the tombstone 130 of an opposing tombstone 130 of an adjacently positioned group. The cover 150 is heat sealed to the battery housing 160 with the terminal post 140 extending through and out of the cover 150.

The conventional lead acid battery 100 has a number of drawbacks. For example, the use of the vertical tombstone 130 restricts the vertical height of the cell of battery plates 110 in the housing 160. This restricts the amount of energy available in the same size battery housing 160. Further, the additional step of punching out the tombstone holes and the welding together of adjacent tombstones 130 increases the manufacturing steps and cost of production. A lead acid battery design that reduces the height, or completely eliminates the tombstone 130 would allow the height of the cells of battery plates 110 to be increased, providing more energy in the same sized battery housing 160.

SUMMARY

One of the objects of the invention, among others, is to address one or more of the disadvantages of the conventional lead acid battery.

A lead acid battery has a housing having a plurality of adjacently positioned battery plate receiving compartments. A cell of battery plates is positioned in each battery plate receiving compartment. Each cell has a plurality of positive plates, each having a positive lug, and a plurality of negative plates interleaved with the positive plates, each having a negative lug. A mold positioned on a top edge of each group of battery plates, and has two strap molding wells, each having a lead receiving space, a well base, and a plurality of lug receiving openings positioned in the well base. The positive lugs of the cell extend through the lug receiving openings in one of the strap molding wells, and the negative lugs of the cell extend through the lug receiving openings in the other strap molding well.

BRIEF DESCRIPTION OF THE DRAWINGS

The invention will now be described by way of example, with reference to the accompanying Figures, of which.

DETAILED DESCRIPTION OF THE EMBODIMENTS

Figure 1:
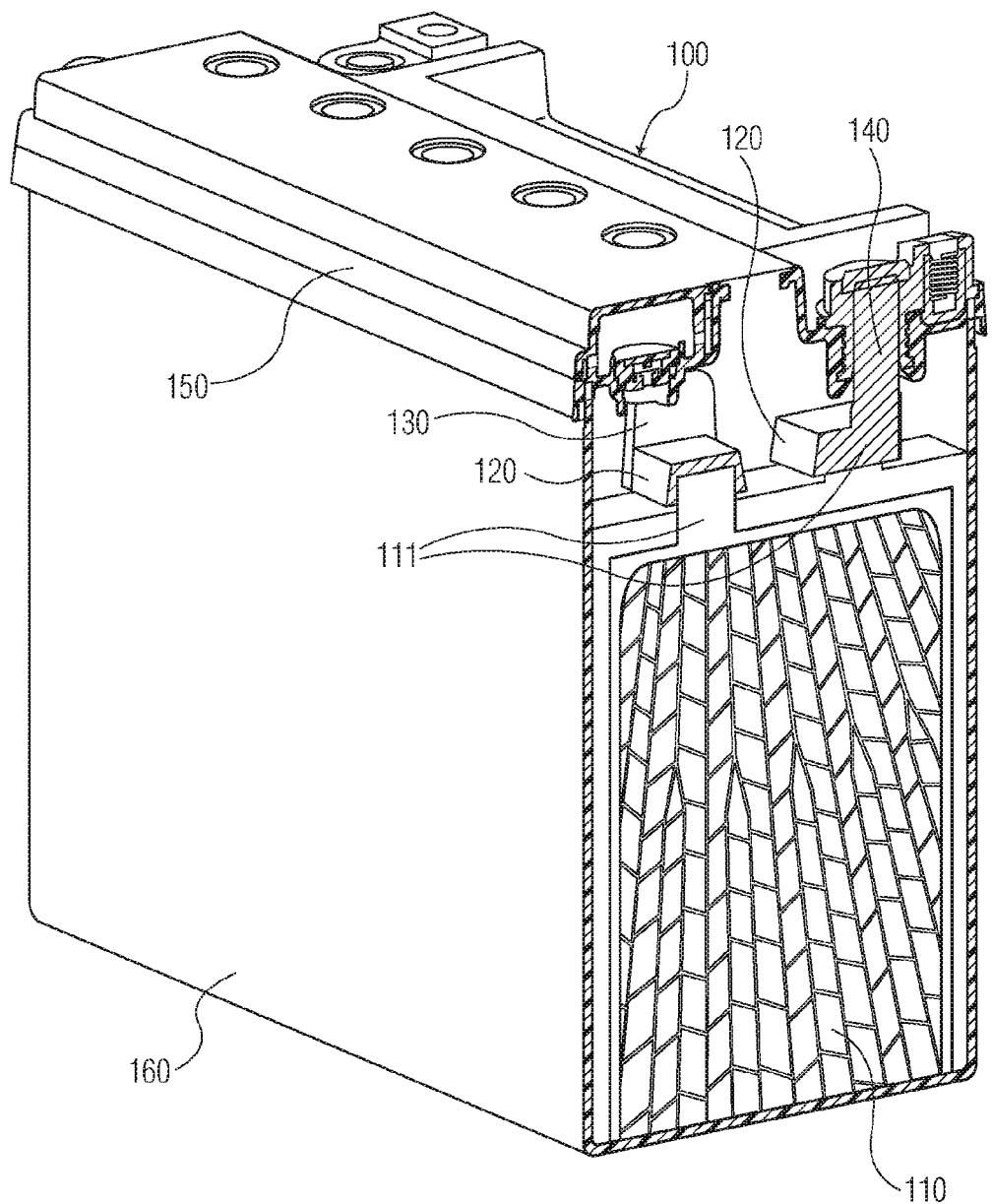
FIG. 1 is a sectional perspective view of a side of a conventional lead acid battery.
Figure 2:
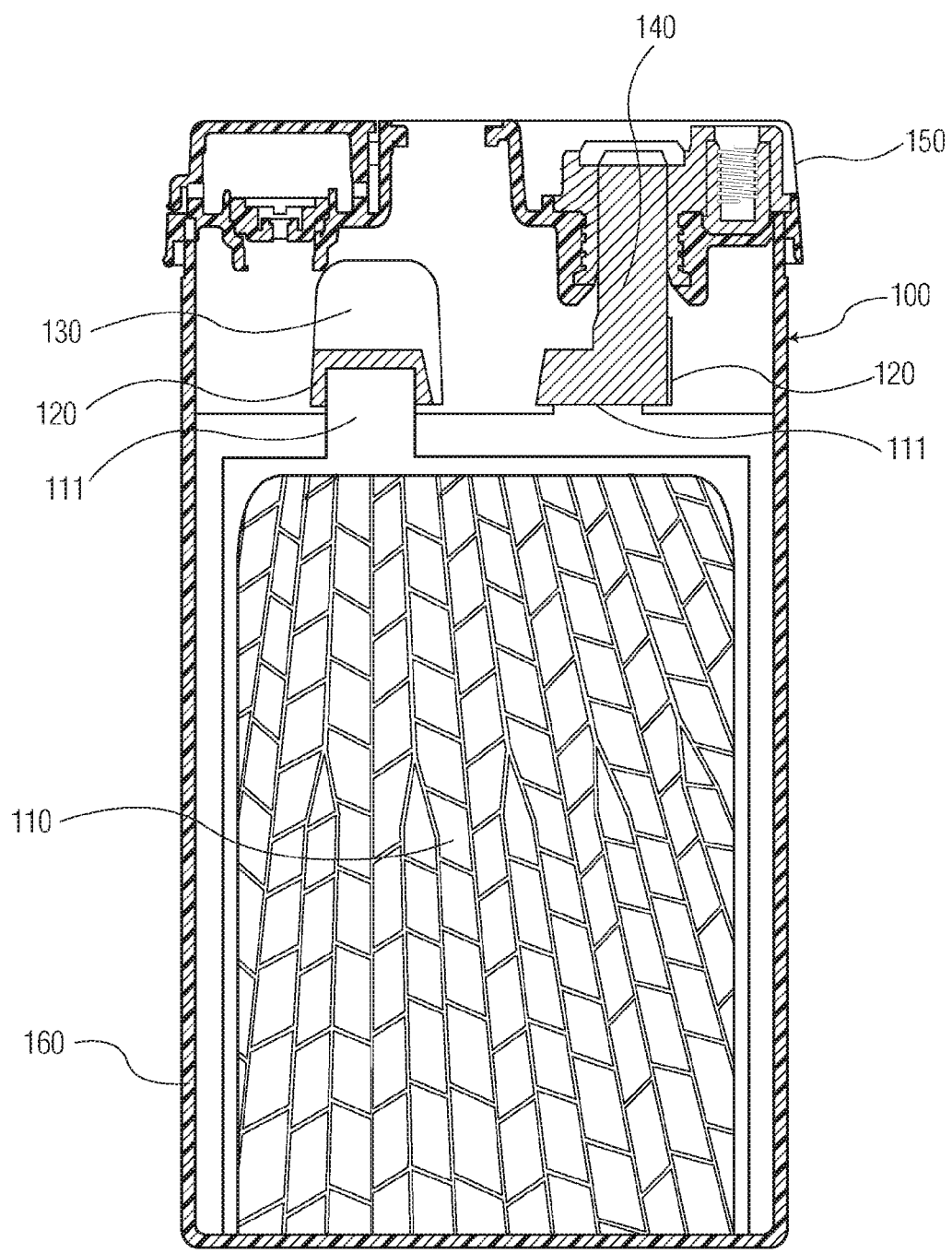
FIG. 2 is a sectional view of an end the battery in FIG. 1.

An embodiment of a lead acid battery 1 shown in FIGS. 3-7 and 9-10 has a housing 10, at least one cell of battery plates 20, a mold 30, a cover 40, a lead strap 50, a manifold 60, and terminal posts 70.

The housing 10 is a box-like container having a front wall 11, a rear wall 12, a first and second side wall 13a, 13b, and a base wall 14. In an embodiment, the length and height of the front wall 11 and the rear wall 12 are approximately equal. In another embodiment, the length and height of the first side wall 13a and the second side wall 13b are approximately equal. The width of the base wall 14 is approximately equal to the length of the side walls 13a,13b. The length of the base wall 14 is approximately equal to the length of the front wall 11 and the rear wall 12. The height of the side walls 13a, 13b is approximately equal to the height of the front wall 11 and the height of the rear wall 12. The interior of the housing 10 forms a battery plate receiving space 15. In an embodiment, the housing 10 further includes a divider wall 16. The height of the divider wall 16 is approximately equal to the height of the front wall 11 and the height of the rear wall 12. In other embodiments, the housing 10 includes a plurality of divider walls 16, including two, three, four, five, six, seven, or eight divider walls 16. The housing 10 can be made from a heat moldable resin or any suitable plastic material known to those of ordinary skill in the art.

Figure 8:
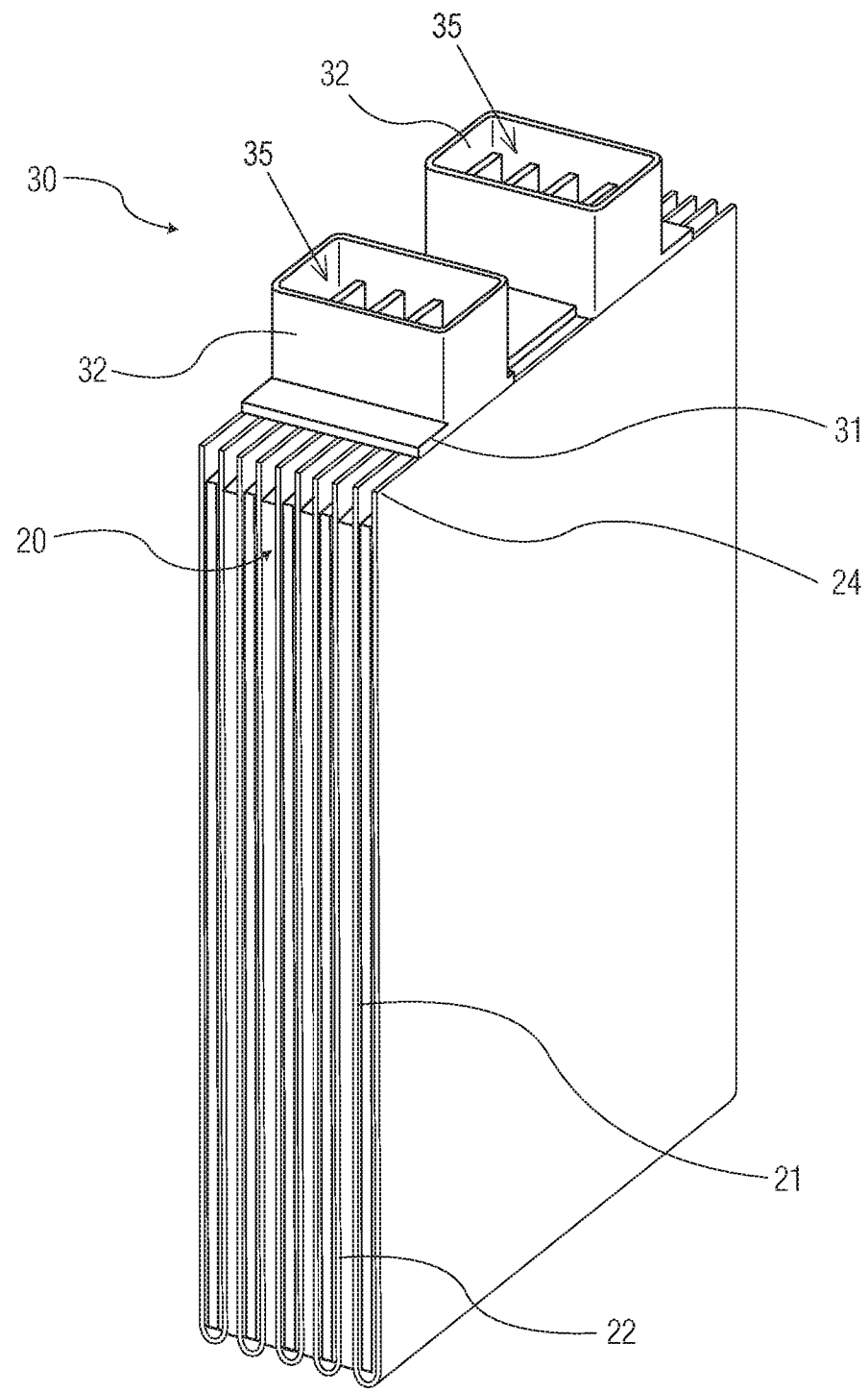
FIG. 8 is a perspective view of the mold positioned on a group of battery plates.

As shown in FIG. 8, each cell of battery plates 20 includes a plurality of positive plates 21, a plurality of negative plates 22, and a plurality of separators 24. Each plate 21,22 has a tab 23 disposed on a top end. In an embodiment, a tab 23a on each positive plate 21 is offset from the location of a tab 23b on each negative plate 22. The tabs 23a,23b are also known by those of ordinary skill the art as lugs, and the term "lug" may be used interchangeably with the term "tab".

The mold 30 includes a floor 31, at least two strap molding wells 32, and a plurality of sides 33. Alternatively, the mold 30 may have a single strap molding well 32 whereby two such molds 30 would be required to accommodate the tabs 23 shown in FIG. 8. Each strap molding well 32 includes a lead receiving space 35 and a plurality of tab receiving openings 33. The tab receiving openings 33 are positioned on a base portion 34 of the lead receiving space 35. The tab receiving openings 33 extend through the base portion 34. In an embodiment, the mold 30 has an electrolyte access hole 36 extending through the floor 31. The strap molding wells 32 can be rectangular, square, circular, or any other shape capable of having the tab receiving openings 33. The mold 30 can be made from a heat moldable resin or any suitable material known to those of ordinary skill in the art.

Figure 3:
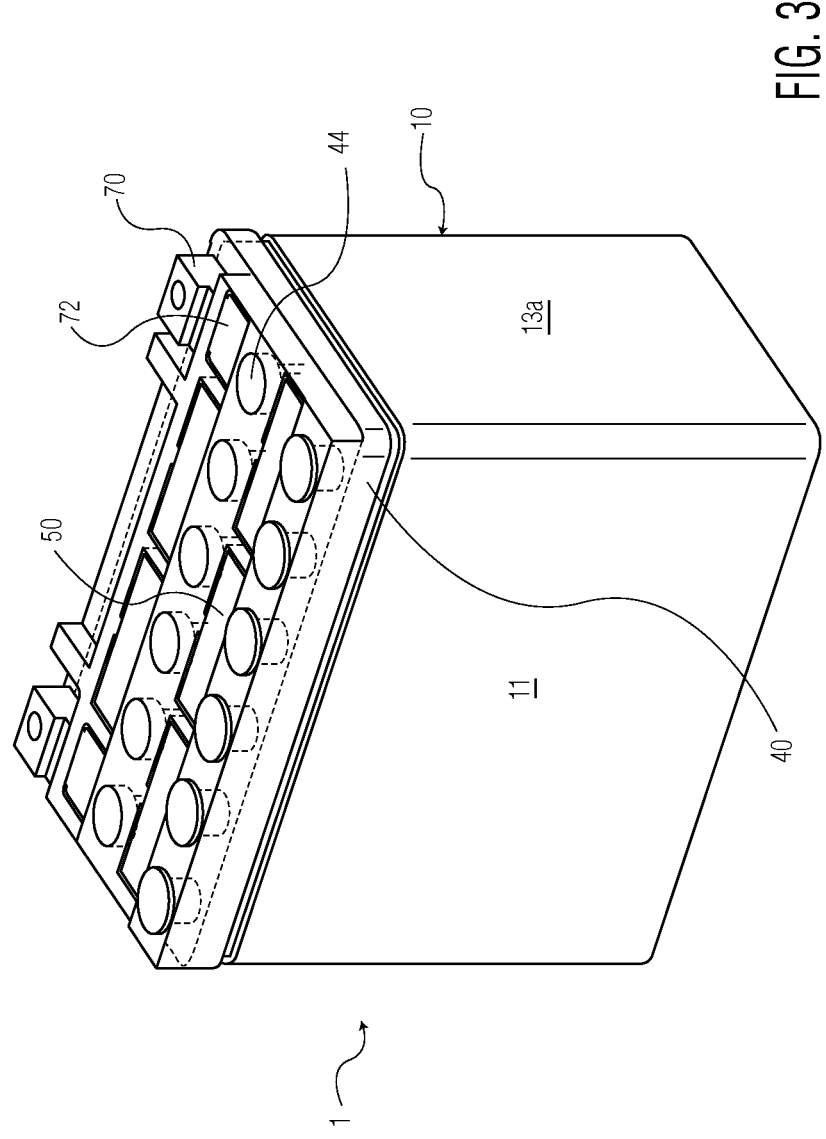
FIG. 3 is an oblique view of a lead acid battery embodiment according to the invention.
Figure 4:
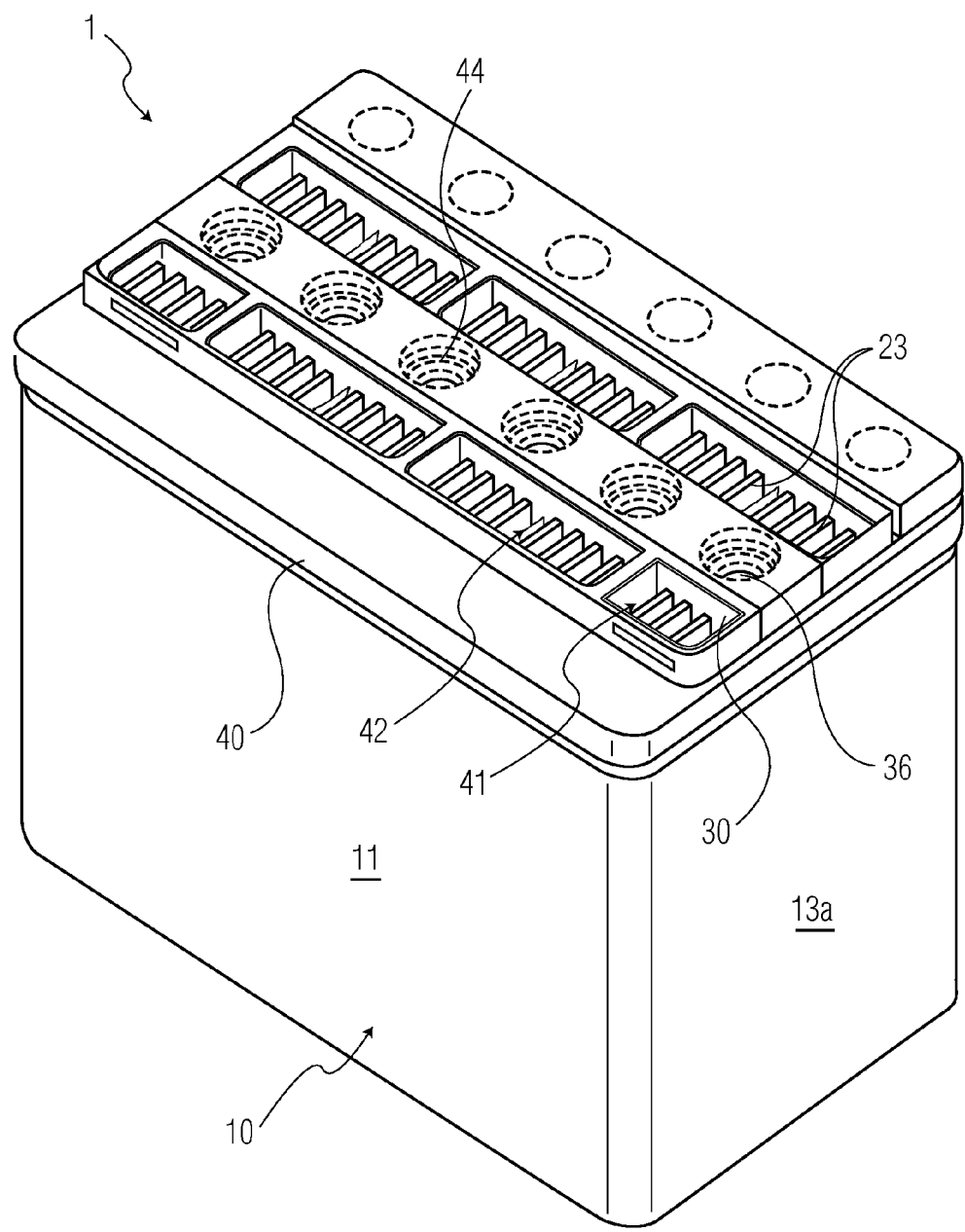
FIG. 4 is an oblique view of the lead acid battery of FIG. 3 before final processing is completed.
Figure 5:
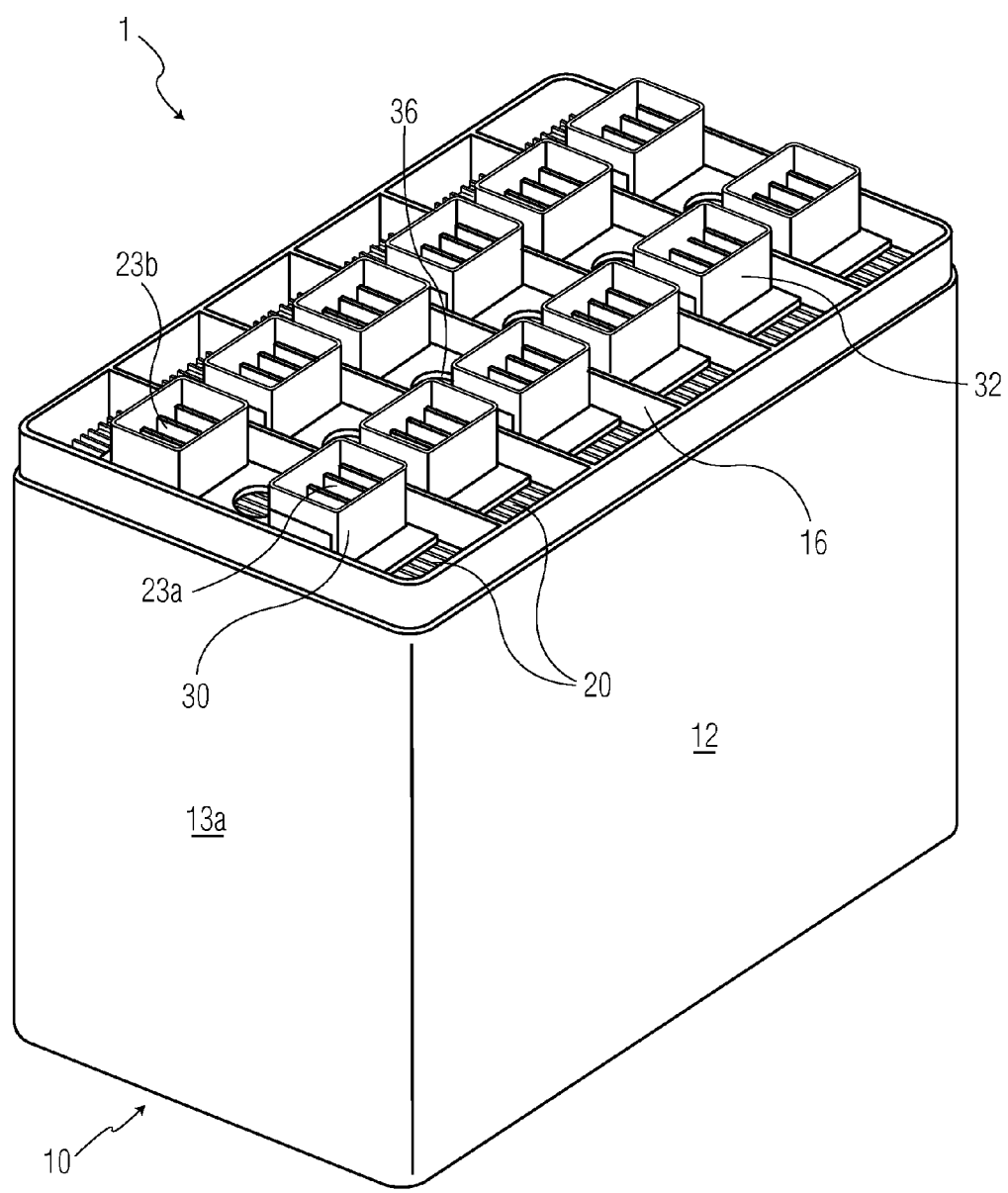
FIG. 5 is an oblique view of the lead acid battery of FIG. 3 showing the positioning of molds positioned on battery plates before final processing.
Figure 6:
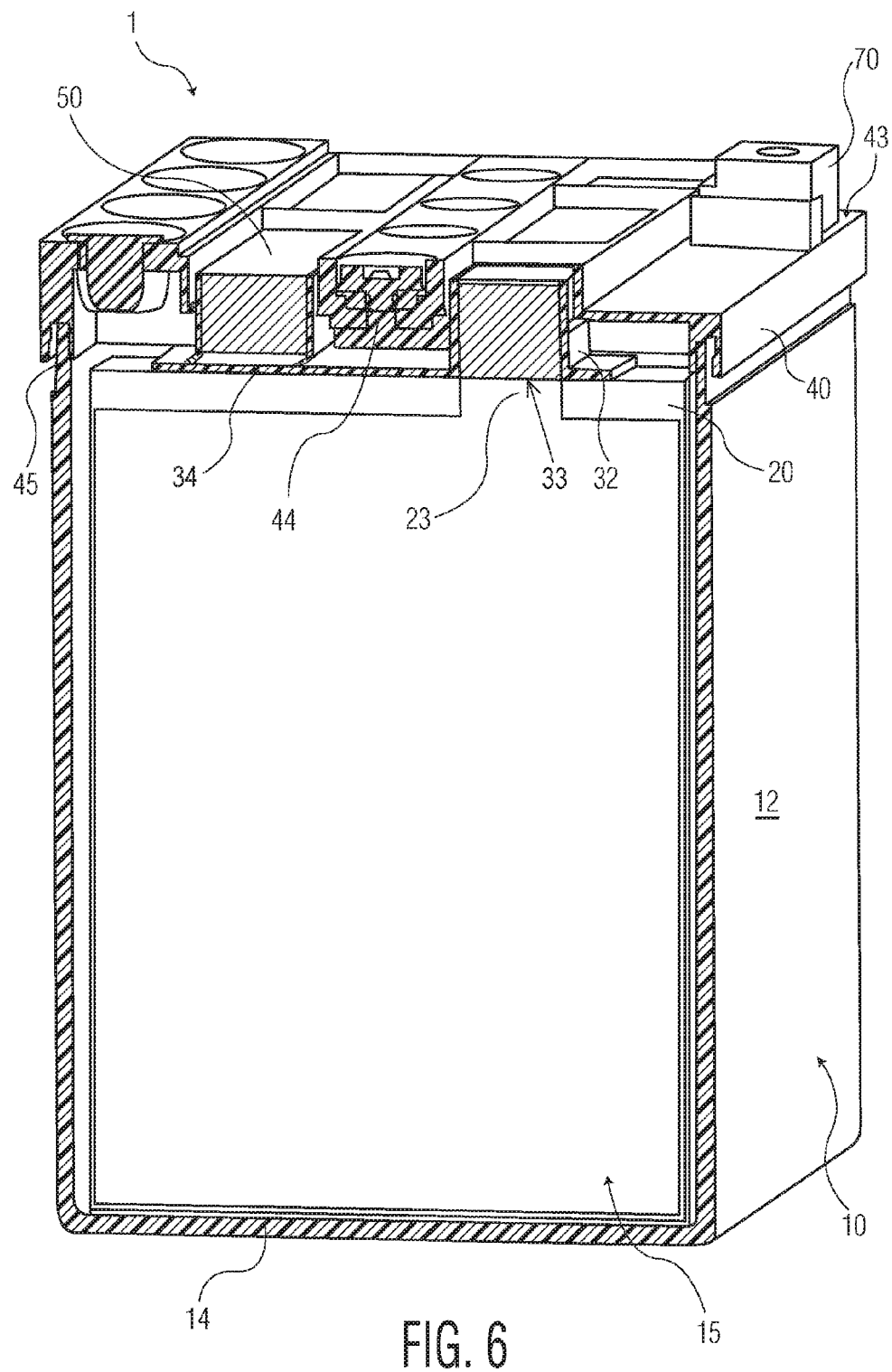
FIG. 6 is a sectional view of an end of the lead acid battery of FIG. 3.
Figure 7:
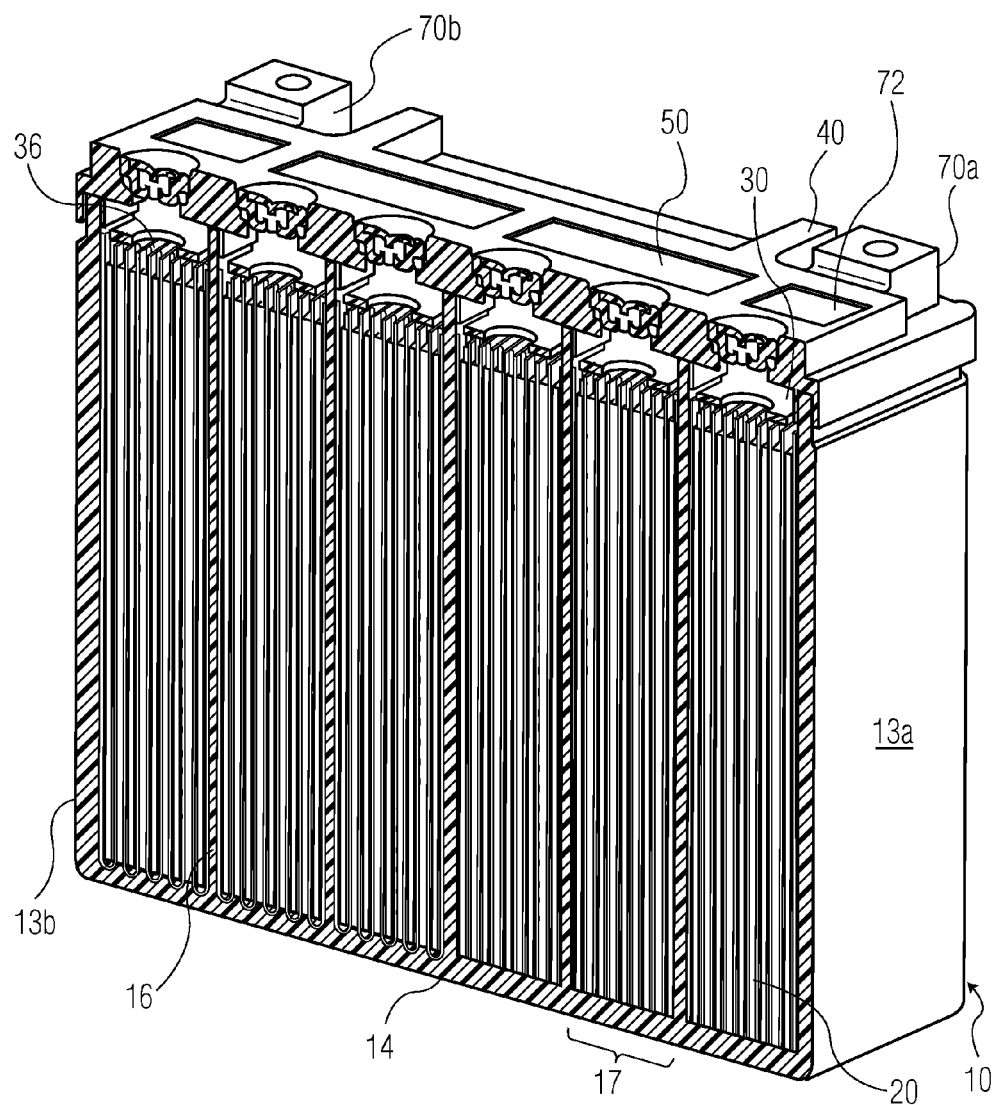
FIG. 7 is a sectional perspective view along the length of the lead acid battery of FIG. 3

As shown in FIGS. 3, 6, and 7, the cover 40 is provided for the housing 10. Exemplary embodiments of the cover 40 include a plurality of mold well receiving openings 41, cutouts 42, and at least two terminal bushings 43. The cover 40 is generally rectangular in shape, with a length greater than the length of the base wall 14 of the housing 10 and with a width greater than the width of the base wall 14. A wall receiving groove 45 extends around the periphery of a bottom surface of the cover 40, proximate to an outer circumferential edge of the cover 40. Further embodiments include an electrolyte filling hole 44 extending through the cover 40. The number of electrolyte filling holes 44 is at least one, or is equal to the number of cells of battery plates 20 used in the battery 1. The cover 40 can be made from a heat moldable resin or any suitable plastic material known to those of ordinary skill in the art.

The lead strap 50 is made of lead, lead alloy or an electrically conductive metal.

Figure 9:
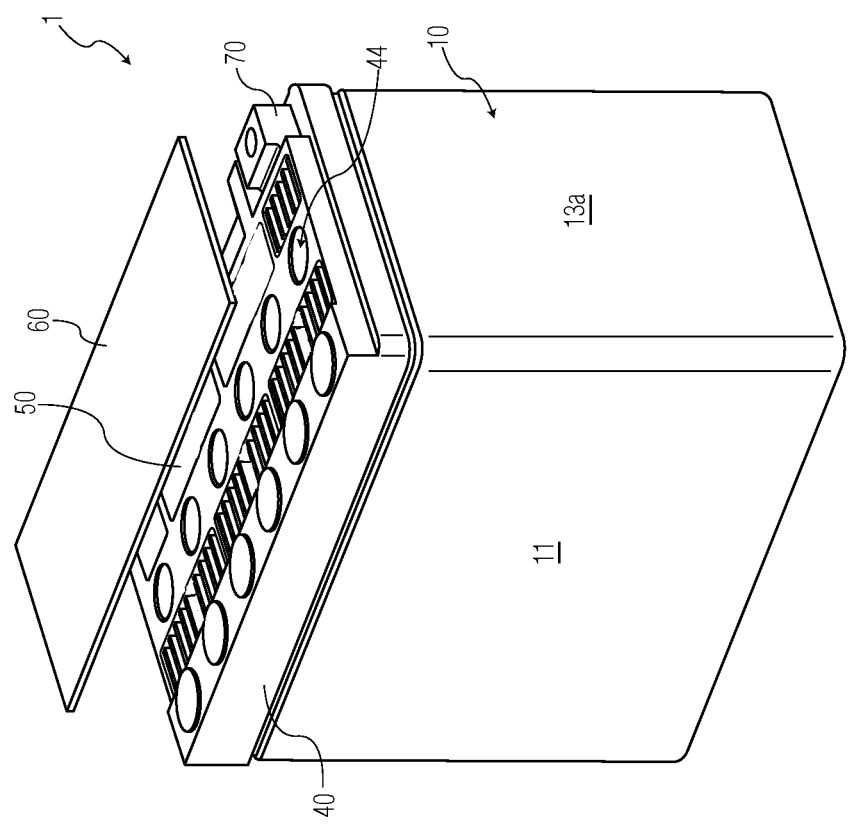
FIG. 9 is a partially exploded view of the lead acid battery of FIG. 3 and a manifold.
Figure 10:
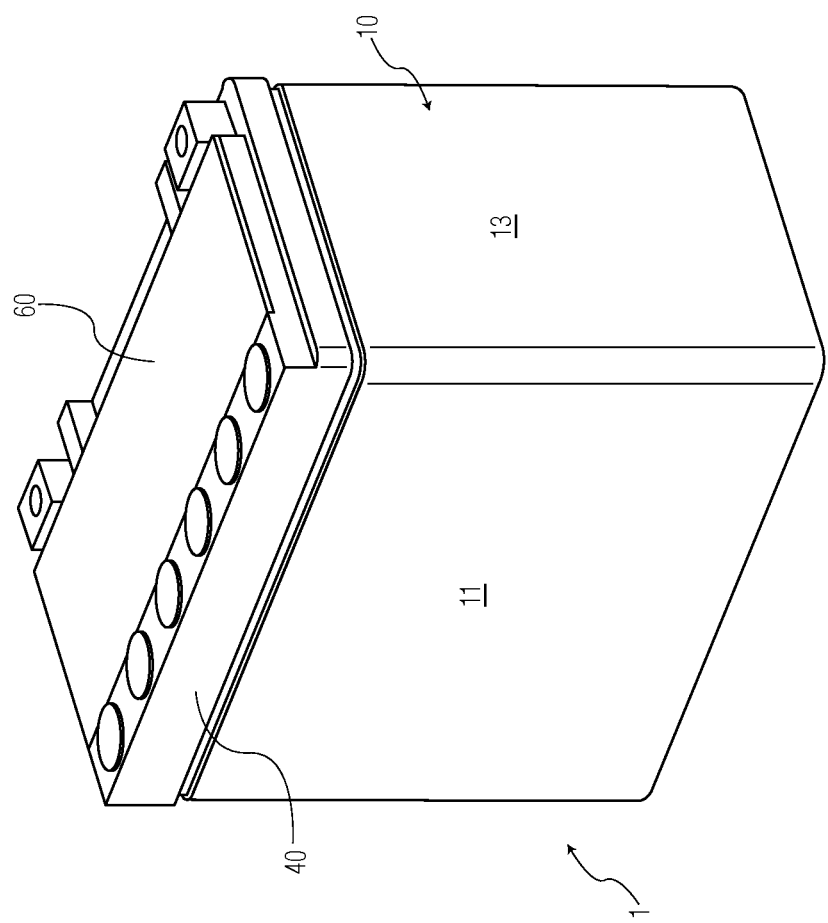
FIG. 10 is a perspective view of the lead acid battery of FIG. 3 having a manifold.

An exemplary embodiment of the manifold 60 is shown in FIGS. 9 and 10. The manifold 60 is made from a heat moldable resin or any plastic material known to those of ordinary skill in the art.

Figure 11:
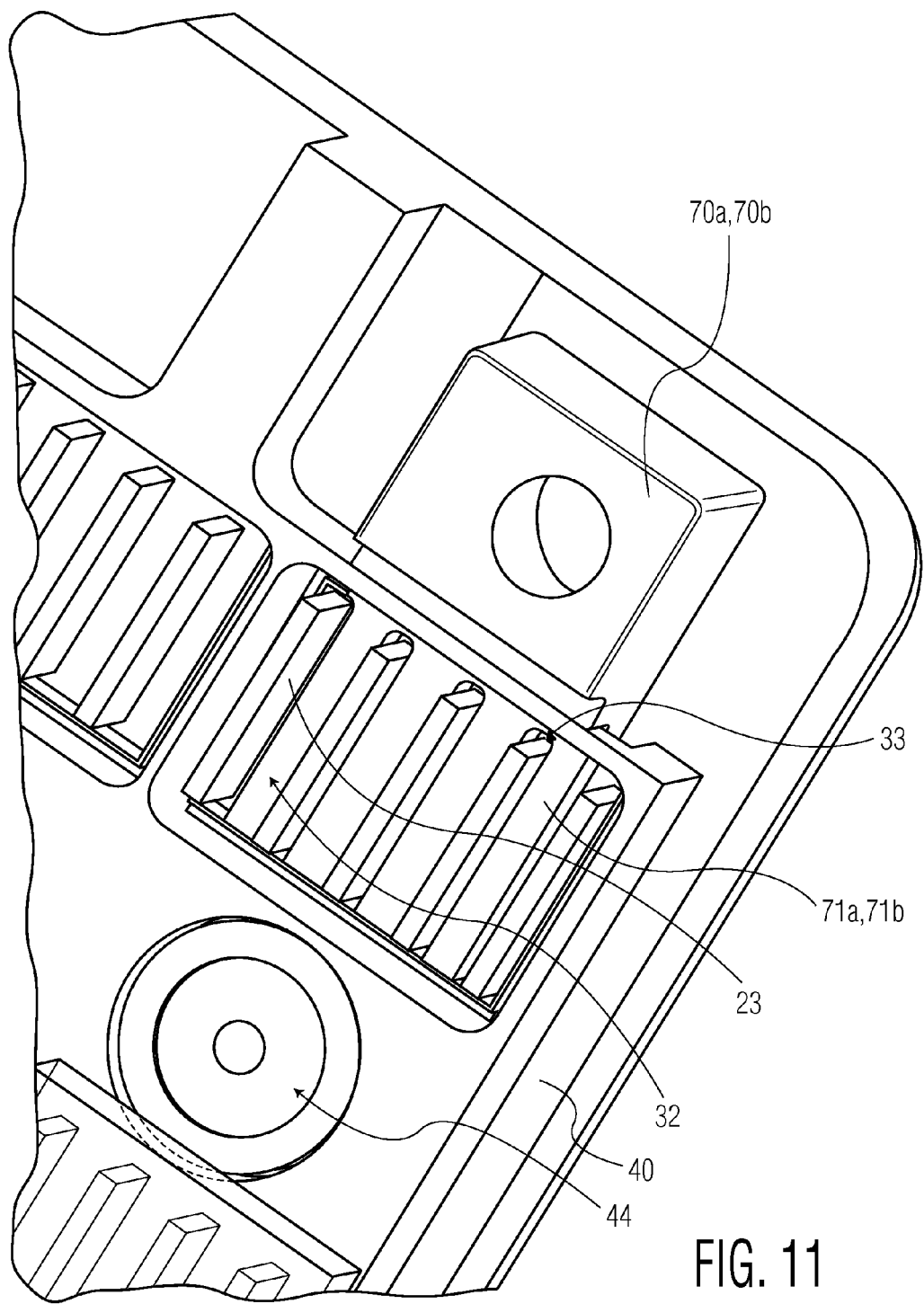
FIG. 11 is a top view of a terminal post and terminal post feet.

The terminal posts 70 include a positive terminal post 70a and a negative terminal post 70b. See FIGS. 11 and 12. The positive terminal post 70a includes terminal post feet 71a, and the negative terminal post 70b includes terminal post feet 71b. FIG. 11 shows an example of the positive terminal post 70a having terminal post feet 71a, however, one of ordinary skill in the art would appreciate that the negative terminal post 70b having terminal post feet 71b is substantially the same as shown in FIG. 11. The terminal posts 70 are made from lead, copper, or any other common electrically conductive material known to those of ordinary skill in the art.

Assembly of the major component will now be describe in detail with reference to FIGS. 3-7. The housing 10 is molded to form the front wall 11, rear wall 12, side walls 13, and the base wall 14 connected to each other in the relationship described above. A front edge of the first side wall 13a extends from a first edge of the front wall 11 and a rear edge of the first side wall 13a extends from a first edge of the rear wall 12. A front edge of the second sidewall 13b extends along a second edge of the front wall 11, and a rear edge of the second sidewall 13b extends along a second edge of the rear wall 12. An upper surface of the base wall 14 connects a bottom edge of the front wall 11 to the rear wall 12, and extends between first and second side walls 13a,13b to form a box-like container having the battery plate receiving space 15 in the interior.

In an embodiment, the divider wall 16 is integrally molded and positioned in the battery plate receiving space 15. A front edge of the divider wall 16 is connected continuously along an inner surface of front wall 11, and a rear edge of the divider wall 16 is connected continuously along an inner surface of the rear wall 12. A bottom edge of the divider wall 16 is connected continuously along an inner surface of the base wall 14 between the front wall 11 and the rear wall 12. Battery cell receiving compartments 17 are formed between adjacent divider walls 16. The number of battery cell receiving compartments 17 is dependent upon the number of divider walls 16. The relationship between the number of battery cell receiving compartments 17 to divider walls 16 is N+1, where N is the number of divider walls 16. Therefore, the total number of battery cell receiving compartments 17 is equal to the number N of divider walls 16 plus one. Each battery cell receiving compartment 17 is isolated from each other, such that an added electrolyte solution is retained in each individual battery cell receiving compartment 17.

Each cell of battery plates 20 includes a stack of interleaved positive plates 21, negative plates 22, and a separator 24 disposed between each plate to prevent the plates 21,22 from touching and short circuiting the cell 20. The cell of battery plates 20 is positioned in the battery plate receiving space 15 of the housing 10, such that the tabs 23 extend towards the top of the battery 1. In embodiments where a plurality of cells 20 are employed, each cell 20 is positioned individually in each battery cell receiving compartment 17.

As seen in FIG. 8, the floor 31 of the mold 30 extends along the length of the mold's 30 base. In the illustrated embodiment, two strap molding wells 32 are disposed on opposing ends of the mold 30, and positioned on a top surface of the floor 31. The mold 30 is positioned on the top edge of a cell of battery plates 20 that have been inserted into the battery plate receiving space 15 and/or the battery cell receiving compartment 17. The tabs 23 on the battery plates 21,22 pass through the tab receiving openings 33 and extend into the lead receiving space 35. The tab receiving openings 33 secure the tabs 23 and hold the battery plates 21,22 in alignment. In an embodiment, the electrolyte access hole 36 is positioned between the two strap molding wells 32, and passes through the floor 31. In other embodiments, the electrolyte access hole 36 is positioned on an end of the mold 30, and passes through the floor 31.

In embodiments having a plurality of cells 20 inserted into adjacent battery cell receiving compartments 17, the adjacent tabs 23 from the cells of battery plates 20 are of reverse polarity. For example, if one cell 20 has the positive plate 21 tabs 23a positioned proximate to the front wall 11 and the negative plate 22 tabs 23b are proximate to the rear wall 12, a second cell 20 positioned in an adjacent battery cell receiving compartment 17 will have the negative plate 22 tabs 23b proximate to the front wall 11, and the positive plate 21 tabs 23a positioned proximate to the rear wall 12. The reverse polarity relationship continues when a plurality of cells 20 are present in other embodiments of the battery 1.

This reverse polarity relationship allows adjacent tabs 23a, 23b of reverse polarity to be connected in series, as described in detail below.

The cover 40 is positioned on a top edge of the front wall 11, rear wall 12, and the first and second side walls 13a,13b of the housing 10. The cover 40 is sealed to the housing 10. The strap molding well 32 is aligned with mold well receiving opening 41 and partially extends into the mold receiving opening 41. The cutouts 42 are rectangular channels cut into the cover 40 extending between adjacent strap molding wells 32 of adjacent molds 30, where the tabs 23 inserted in the strap molding wells 32 are of reverse polarity (tabs 23a,23b).

The lead strap 50 is formed by heating and pouring molten material such as lead into the strap molding well 32 of a first mold 30, the cutouts 42 of cover 40, and the strap molding well 32 of an adjacent second mold 30 having tabs 23 of reverse polarity to that of the first mold 30. The tabs 23 in the first and second strap molding wells 32 are thereby embedded in the lead strap 50 to create an electrical connection between adjacent cells of battery plates 20. While the molten material is being poured into the mold 30 and cutout 42, a heat source such as a torch or laser is used to melt the tabs 23 in each strap molding well 32 together. The melted tabs 23 combine with the molten material to form the lead strap 50.

FIG. 3 illustrates an exemplary embodiment of the battery 1 having six cells of battery plates 20 with five lead straps 50. As discussed above, adjacent tabs 23 from the cells of battery plates 20 are of reverse polarity 23a, 23b, and that the adjacent tabs 23a,23b of reverse polarity are embedded in the lead strap 50 to connect all of the six cells of battery plates 20 in series. In this exemplary embodiment, the positive tabs 23a of a first cell of battery plates 20 are positioned proximate the front wall 11 and are connected through a first lead strap 50 to the negative tabs 23b of a second cell of battery plates 20, where the negative tabs 23b are also proximate to the front wall 11. The positive tabs 23a of the second cell of battery plates 20 are positioned proximate to the rear wall 12 and are connected through a second lead strap 50 to the negative tabs 23b of a third cell of battery plates 20, which are also positioned proximate to the rear wall 12. The positive tabs 23a of the third cell of battery plates 20 are positioned proximate to the front wall 11 and are connected through a third lead strap 50 to the negative tabs 23b of a fourth cell of battery plates 20. A fifth cell of battery plates 20 is connected through a fourth lead strap 50 to the fourth cell of battery plates 20, and a sixth cell of battery plates 20 is connected through a fifth lead strap 50 to the fifth cell of battery plates 20 in the same fashion as described above for connecting the first, second and third cells of battery plates 20.

An epoxy seal or any other suitable sealant compound known to those of ordinary skill in the art is filled around each lead strap 50 to seal the lead strap 50.

Figure 12:
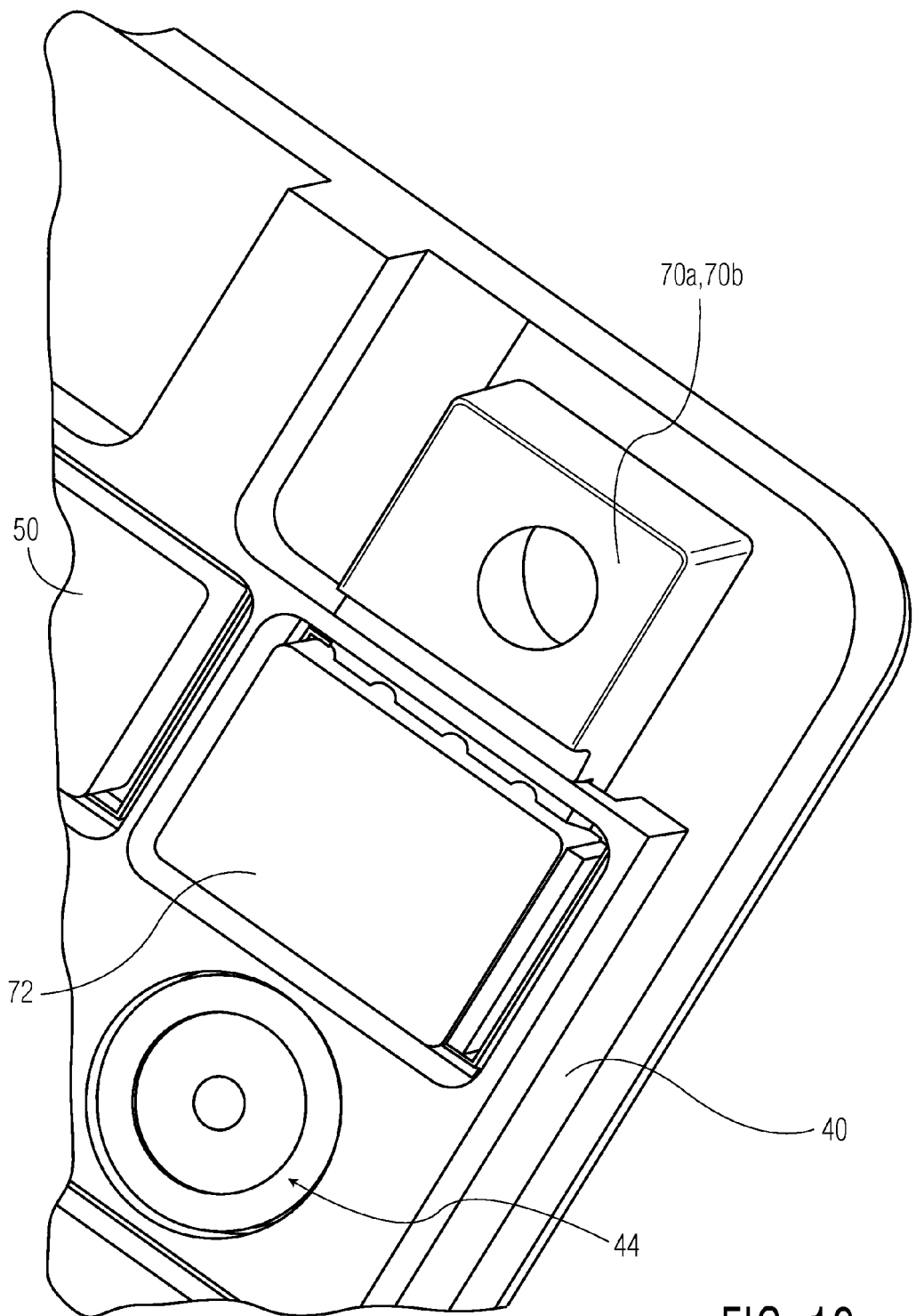
FIG. 12 is a top view of a terminal post having a lead plug covering the terminal post feet shown in FIG. 11.

The positive terminal post 70a is connected to the positive tabs 23a of a first terminal cell of battery plates 20 through the terminal post feet 71a. As shown in FIGS. 11 and 12, the terminal post feet 71a extend from the positive terminal post 70a into the strap molding well 32 of the mold 30, and are positioned between the positive tabs 23a of the cell of battery plates 20. The terminal post feet 71a and positive tabs 23a of the first terminal cell of battery plates 20 are embedded in a lead plug 72 that fills the strap molding well 32 housing the terminal post feet 71a and the positive tabs 23a. See FIG. 12. While the molten material is being poured into the strap molding well 32, a heat source such as a torch or laser is used to melt the positive tabs 23a and the terminal post feet 71a together. The melted positive tabs 23a and terminal post fee 71a combine with the molten material to form a connection with the positive terminal post 70a.

The negative terminal post 70b is connected to the negative tabs 23a of a second terminal cell of battery plates 20 through the terminal post feet 71b. As shown in FIGS. 11 and 12, the terminal post feet 71b extend from the negative terminal post 70b into the strap molding well 32 of the mold 30, and are positioned between the negative tabs 23b of the cell of battery plates 20. The terminal post feet 71b and negative tabs 23b of the second terminal cell of battery plates 20 are embedded in a lead plug 72 that fills the strap molding well 32 housing the terminal post feet 71a and the negative tabs 23b. See FIG. 12. While the molten material is being poured into the strap molding well 32, a heat source such as a torch or laser is used to melt the negative tabs 23b and the terminal post feet 71b together. The melted negative tabs 23b and terminal post fee 71b combine with the molten material to form a connection with the negative terminal post 70b.

As shown in FIGS. 9 and 10, the manifold 60 is positioned on top of the cover 40, over the lead straps 50, and is heat sealed to the cover 40, covering the top of the battery 1 and the lead straps 50.

The electrolyte solution is added in the form of a dilute sulfuric acid solution to fill the majority of remaining space within the battery plate receiving space 15 or battery cell receiving compartments 17. In another embodiment, other common acids known to those of ordinary skill in the art may be used to form the electrolyte solution. In yet another embodiment, the electrolyte may be a silica-based gel.

The advantages of the embodiments described in FIGS. 3-8 are that the conventional vertical tombstone is eliminated, allowing the vertical height of the cell of battery plates 20 to be increased without a corresponding increase in the size of the battery 1. Therefore, more energy can be provided in the same sized battery housing 10. Additionally, manufacturing steps are eliminated, because the steps of punching out tombstone holes and welding together of adjacent tombstones 130 are eliminated.

It is to be understood that the form of the above described embodiments of the invention are shown merely an exemplary embodiments. Various changes may be made in the function and arrangement of parts; equivalent means may be substituted for those illustrated and described; and certain features may be used independently from others without departing from the spirit and scope of the invention as defined in the following claims.

What is claimed is:
1. A lead acid battery comprising:
  a housing having
    an open first end, and
    a plurality of adjacently positioned battery plate receiving compartments;
  a cell of battery plates positioned in each battery plate receiving compartment, each cell having
    a plurality of positive plates, each having a positive lug, and
    a plurality of negative plates interleaved with the positive plates, each having a negative lug;
  a mold positioned on a top edge of each cell of battery plates, and having
    two strap molding wells, each having
      a lead receiving space,
      a well base, and a plurality of lug receiving openings positioned in the well base, the positive lugs of the cell extending through the lug receiving openings in one of the strap molding wells, and the negative lugs of the cell extending through the lug receiving openings in the other strap molding well, and a floor extending between the two strap molding wells; and a cover separate from the molds and positioned over the molds on the first end of the housing, the cover having a plurality of mold well receiving openings, two mold well receiving openings positioned over each battery plate receiving compartment.

2. The lead acid battery of claim 1, wherein the positive lugs and the negative lugs extend into the lead receiving space of each strap molding well.

3. The lead acid battery of claim 2, wherein the two strap molding wells of each mold partially extend into the two mold well receiving openings over each battery plate receiving compartment.

4. The lead acid battery of claim 3, wherein the cover further includes rectangular cutouts extending as a channel between two strap molding wells of two separate molds positioned on cells in adjacent battery plate receiving compartments.

5. The lead acid battery of claim 4, further comprising a lead strap positioned in each cutout.

6. The lead acid battery of claim 5, wherein the lead strap extends from each cutout into the lead receiving spaces of two strap molding wells positioned on cells in adjacent battery plate receiving compartments.

7. The lead acid battery of claim 6, wherein the lead strap is integrally connected with the lugs in each of the two strap molding wells position on cells in adjacent battery plate receiving compartments.

8. The lead acid battery of claim 5, further comprising an epoxy seal filled around each lead strap.

9. The lead acid battery of claim 7, further comprising a first terminal post having first terminal post feet positioned in one strap molding well.

10. The lead acid battery of claim 9, wherein the first terminal post feet are interleaved into the lugs positioned in the strap molding well.

11. The lead acid battery of claim 10, wherein the first terminal post feet are integrally connected to both the lugs and the lead strap.

12. The lead acid battery of claim 11, further comprising a second terminal post having second terminal post feet positioned in another strap molding well, the second terminal post feet being interleaved between the lugs positioned in the other strap molding well and being integrally connected to both the lugs and the lead strap.

13. The lead acid battery of claim 12, wherein the cover further includes at least two terminal bushings.

14. The lead acid battery of claim 13, further comprising a manifold positioned on the cover.

15. The lead acid battery of claim 14, wherein the manifold is positioned over the lead straps and sealed to the cover.

16. The lead acid battery of claim 1, wherein the floor has an electrolyte access hole.

17. The lead acid battery of claim 16, wherein the cover has corresponding electrolyte filling holes positioned over the electrolyte access hole.

* * * * *